(12) United States Patent
Rutherford et al.

(10) Patent No.: US 6,309,530 B1
(45) Date of Patent: Oct. 30, 2001

(54) CONCENTRATION OF CHLOR-ALKALI MEMBRANE CELL DEPLETED BRINE

(75) Inventors: Jeffrey A. Rutherford, Kenner, LA (US); John Rutherford, Punta Gorda, FL (US)

(73) Assignee: Texas Brine Company, LLC., Houston, TX (US)

( * ) Notice: Subject to any disclaimer, the term of this patent is extended or adjusted under 35 U.S.C. 154(b) by 0 days.

(21) Appl. No.: 09/665,112

(22) Filed: Sep. 20, 2000

(51) Int. Cl.$^7$ .................................................. C25B 1/16
(52) U.S. Cl. ........................ 205/516; 205/536; 423/182
(58) Field of Search ............................. 205/516, 536; 423/182

(56) References Cited

U.S. PATENT DOCUMENTS

| | | | |
|---|---|---|---|
| 4,586,993 | 5/1986 | O'Brien | 204/98 |
| 5,028,302 | 7/1991 | Rutherford et al. | 204/98 |
| 5,126,019 | 6/1992 | Rutherford et al. | 204/98 |
| 5,466,347 | * 11/1995 | Shimamune et al. | 205/536 |

OTHER PUBLICATIONS

O'Brien, T.F. Control of Sultates in Membrane Systems, pp. 326–349 (no date).

* cited by examiner

Primary Examiner—Arun S. Phasge
(74) Attorney, Agent, or Firm—Peter F. Casella

(57) ABSTRACT

This invention relates to methods, systems and installations for concentrating depleted brine produced by the electrolytic decomposition of concentrated brine in chlor-alkali membrane cells and to the efficient use of power, steam and brine. More particularly, this invention relates to the use of depleted brine directly into evaporation systems, which are used to concentrate the brine for reuse in membrane cells or other processes. This invention employs the phenomena that a week unsaturated brine boiling under reduced pressure has a lower boiling point rise (BPR) than a saturated brine boiling at the same or higher pressure. The concentration of depleted brine at a lower boiling point rise improves the operating efficiency of either mechanical vapor recompression and/or steam jet thermocompression. Further, this invention allows for concentrating the depleted brine at temperatures low enough to utilize plastic materials of construction. The use of plastic materials of construction in place of metals in the major components of the installation eliminates or minimizes the metal contamination of the brine being concentrated.

19 Claims, 4 Drawing Sheets

CONCENTRATION OF CHLOR-ALKALI MEMBRANE CELL DEPLETED BRINE

BACKGROUND OF THE INVENTION

Processes for the production of chlorine and sodium hydroxide have changed dramatically in the past 20 to 25 years. At the start of that time period a large percentage of the chlorine and caustic soda (sodium hydroxide solution) produced in the United States was produced by the electrolytic decomposition of sodium chloride brine in mercury cells and diaphragm cells. The development of the membrane cell led to the virtual elimination of mercury cells and many diaphragm cell installations have been partially or completely converted to membrane cell installations. Also new installations now employ membrane cells, rather than the other types used in the past. The use of membrane cells for electrolytic decomposition have many advantages over the older cells. Among these advantages are elimination of mercury and asbestos pollution problems, reduced power consumption, improved cell efficiency, and better quality of products.

The use of membrane cells also brings a new set of problems. Impurities in the aqueous sodium chloride brine fed to the cells cannot be tolerated in membrane cells to the degree they could be tolerated in diaphragm or mercury cells, because membranes are more easily plugged than are asbestos deposited diaphragms. For example, a few parts of calcium ions per million parts of brine could be tolerated in the diaphragm type cells. This amount of calcium in the feed brine to membrane cells will damage the membranes severely, causing a major drop in cell efficiency with a corresponding increase in power consumption. Also, metallic impurities, such as iron and copper are detrimental in the brine being electrolyzed in membrane cells and must be removed or minimized. Further, while diaphragm cells can perform well with significant amounts of sodium sulfate in the feed brine to the cells, most membrane cells require a sodium sulfate level of less than 8 grams per liter in the feed brine to the cells. Depending upon the operating conditions, levels higher than about 8 grams per liter can contribute to lower efficiencies, including higher power costs, damage to the anode coatings and in some cases, damage to the membranes.

In the operation of diaphragm cells, the major operating cost factors are power, steam, and brine. Membrane cells have dramatically reduced power and steam costs but brine (salt) costs are much more significant because the membranes require high purity brine to operate efficiently. This necessitates the removal of the buildup of certain impurities in the system, such as those referred to above, which are harmful to the performance of the membrane cells.

The source of sodium chloride used in membrane cells may be rock salt, solar salt, byproduct salt from an existing diaphragm cell plant, also known as caustic process or C.P. Salt, purified evaporative salt or brine delivered in a pipeline which has been solution mined from underground salt deposits. Among the factors that influence the selection of the brine/salt source are quality, freight cost, capital cost, disposal costs of impurities that build up in the in the evaporative system (such as bitterns which are waste brines containing 40 grams per litter of sodium sulfate or more, and must be removed for efficient operation), and reliability of the source of supply. Thus, selection of the source of the sodium chloride raw material is an important, and sometimes a critical factor when considering a membrane cell installation. Rock salt, solar salt and diaphragm cell recovered caustic process salt (C.P. salt) contain an undesirable amount of impurities, and they are chosen only when the cost of purer salt (or brine) is too high. Certain plant sites, particularly in New York, Texas, Louisiana, Mississippi and Alabama can be located close enough to underground deposits of salt solution mined at brine wells to make the use of pipeline brine highly desirable. However, this source of brine/salt also has associated problems. Nearly saturated sodium chloride brine from wells contains roughly three pounds of water per pound of sodium chloride. This saturated brine is purified by conventional brine treatment and evaporation methods, followed by further purification in ion exchange units before it is used in membrane cells. It is then acidified and fed to the cells where almost half of the sodium chloride in the feed brine is decomposed to make the products of the electrolysis, i.e., liquid sodium hydroxide, and, gaseous chlorine and hydrogen. The brine exiting the cells consists of approximately 80 weight percent of the water contained in the feed brine and the remaining salt which was not decomposed by the electrolytic process taking place in the cells. This results in an outflow of depleted brine from the cells, usually in the range of 16–18 weight percent sodium chloride (NaCl). Environmental and economic considerations make it impractical to dispose of the depleted brine. Accordingly, various processes and systems have been proposed for treating the depleted brine so it may be recycled to the electrolytic cells as further described in the Prior Art which follows.

PRIOR ART

Various methods for treating depleted brine for use in membrane cells are disclosed by T.F.O'Brien (O'Brien, T.F.; Control of Sulfates in Membrane Systems, pages 326–349).

One method disclosed is to process raw, untreated brine in multiple effect evaporators to produce a slurry of salt and brine that can be mixed with the depleted brine after the depleted brine has been dechlorinated and neutralized. This brings the depleted brine back to the desired concentration of sodium chloride for use in the electrolytic decomposition, i.e. to about 24 weight percent or more sodium chloride. The brine is then treated in a conventional brine treatment system involving the addition of sodium carbonate and sodium hydroxide solutions to precipitate calcium as calcium carbonate and magnesium as magnesium hydroxide. The solids are settled and filtered out of the brine and the brine is sent to ion exchange resin towers for removal of additional calcium and magnesium as well as metal ions that may have been picked up in the raw brine evaporation step. This method of operation requires large amounts of treatment and neutralization chemicals and places a heavier burden on the ion exchange step thereby increasing costs. Also, it requires quadruple or quintuple effect evaporators constructed of expensive materials of construction, including metal bodies, steam chests, circulation pumps, and salt separation equipment.

Another method purifies the incoming brine using a conventional brine treatment system, with the brine then being fed to a multiple effect evaporator or to a mechanical vapor recompression system to produce purified solid salt to supply the salt requirement for the membrane cell plant. In this method dechlorination, neutralization and ion exchange treatment are required in the recycle step. The evaporator systems employing these purification treatments also require extensive use of expensive, sophisticated materials of construction, such as titanium and Inconel, which result in high capital costs as well as high operating costs in their effort to produce good quality solid salt that is low in sodium sulfate content and low in heavy metals. These evaporator systems are usually operated at elevated temperatures, in some cases over 240 degrees Fahrenheit. To protect the ion exchange resins and the membrane cells the depleted brine must be dechlorinated and neutralized before the solid salt is added. Following the ion exchange treatment, the brine must be acidified before introduction to the membrane cells. Still another method of reusing the depleted brine is to convert about one half of the number of cells in an existing diaphragm cell plant to membrane cells, treat all the incoming brine in the conventional brine treatment and ion exchange systems, acidify and then feed all the brine to the membrane cells. The depleted brine is then brought up to proper brine concentration with recovered C.P. salt from the diaphragm cell plant evaporator system. The resaturated brine is then fed to the diaphragm cells and/or the membrane cells.

Other methods for reusing depleted brine are disclosed in U.S. Pat Nos. 4,586,993, 5,028,302, and 5,126,019. The methods and systems described in these patents apply when the brine wells are located close enough to the plant site so that a dual pipeline may be installed at a reasonable capital cost. In this case the dechlorinated, neutralized depleted brine is returned to the wells through one leg of the pipeline so that it can be concentrated in salt content. The concentrated brine so produced is returned to the membrane cell plant site in the second leg of the dual pipeline. A major problem with dual pipeline systems is all of the sodium sulfate, formed in the conventional brine treatment system from the calcium sulfate contained in raw brine, will build up to intolerable levels if it is not removed either before or after return to the wells.

Three patented methods are known for the removal of the required amount of sodium sulfate and to bring the sodium sulfate level in the brine to the low level that membrane cells can tolerate. One method, see U.S. Pat. No. 4,586,993, is to convert the calcium carbonate formed in the conventional brine treatment step to calcium chloride by reacting it with hydrochloric acid and then adding the calcium chloride to the dechlorinated, neutralized, depleted brine entering the wells. This step will precipitate calcium sulfate in the wells, but it raises the level of calcium sulfate leaving the wells in the brine. This increases conventional brine treatment and filtration costs, ion exchange resin costs, and capital equipment costs. U.S. Pat. Nos. 5,028,302 and 5,126,019 relate to the use of refrigeration to remove sodium sulfate. U.S. Pat. No. 5,028,302 discloses refrigeration of the brine returning from the wells. In this case the sodium sulfate removed in the refrigeration step is returned to the wells, suppressing the solubility of calcium sulfate due to the common ion effect. U.S. Pat. No. 5,126,019 deals with refrigeration of the depleted brine before it is introduced into the wells.

OBJECTS OF THE INVENTION

It is an object of this invention to provide methods, systems and installations for resaturating exit brine produced by the electrolytic decomposition of saturated brine in chlor-alkali membrane cells. It is another object of this invention to provide for the efficient use of power, steam and the raw material brine, which allows for the economic use of plastic materials of construction in the major components of the installation. A still further object of this invention is to employ the phenomena that a week unsaturated brine boiling under reduced pressure has a lower boiling point rise (BPR) than a saturated brine boiling at the same or higher pressure. The concentration of depleted brine at a lower boiling point rise improves the operating efficiency of either mechanical vapor recompression and/or steam jet thermocompression. It is still a further object of this invention to allow for concentrating the depleted brine at temperatures low enough to utilize plastic materials of construction. The use of plastic materials of construction in place of metals in the major components of the installation eliminates or minimizes the metal contamination of the brine being concentrated.

In the following description of this invention, the evaporators employed in these systems are designated as concentrators to distinguish from the prior art in this field of technology that uses the term evaporators in systems that produce solid salt for resaturating the depleted brine produced in those systems, and, also because in the systems of this invention the depleted brine is not concentrated to the point where crystals of salt are formed.

BRIEF DESCRIPTION OF THE INVENTION

The foregoing and other objects are accomplished by the methods, systems and installations of this invention which comprise operating the concentrator systems of this invention at low temperatures and reduced pressures by employing the low boiling point rise of weak unsaturated brine boiling under reduced pressure in a way which allows for the efficient use of steam jets and thermocompressors and the introduction of depleted brine exiting the membrane cells after dechlorination and directly into the concentrator system; with or without employing any one or combination of the process purification steps of neutralization, deionization and acidification into preferably the first effect evaporator, and further which minimizes the absolute pressure in that effect so that more water vapor is removed per pound of motive steam than would otherwise be realized by the prior art systems, all of which allows for the use of plastic materials of construction in the major components of the evaporation system, with the realization of a considerable number of economic and operational advantages, as discussed herein.

DESCRIPTION OF THE INVENTION

We have found that considerable capital and operating costs are saved by concentrating the depleted brine and recycling it to the membrane cells at a sodium chloride concentration of about 22–26 weight percent. In accordance with our invention this is accomplished by providing a system that takes advantage of the fact that weaker brines boiling under reduced absolute pressures exhibit significantly smaller boiling point rises (BPR) than saturated brine boiling at atmospheric pressure or higher. By operating at the smaller BPR, reconcentration of the weaker brine to 22–26 weight percent NaCl is accomplished at low temperatures, thus allowing for efficient vapor compression and the use of steam jet thermocompression. In accordance with this invention, because the concentrator systems operate at significantly lower temperatures, for example at or below about 180 degrees Fahrenheit instead of temperatures up to about 240 degrees Fahrenheit as in the prior art, and because the concentrator system does not contain or produce solid salt, the major components of our concentrator system can be fabricated out of plastic materials of construction or plastic linings may be used on other materials of construction, with all the attendant advantages, as is discussed herein. The major components of the concentrator system that may be constructed of plastic or plastic lined equipment include all components in contact with the brine including piping, valves, pumps, separators, and heat exchangers. Plastic lined equipment includes conventional (sheet) plastic lined equipment as well as fusion bonded plastic to metal equipment.

Figure 1:
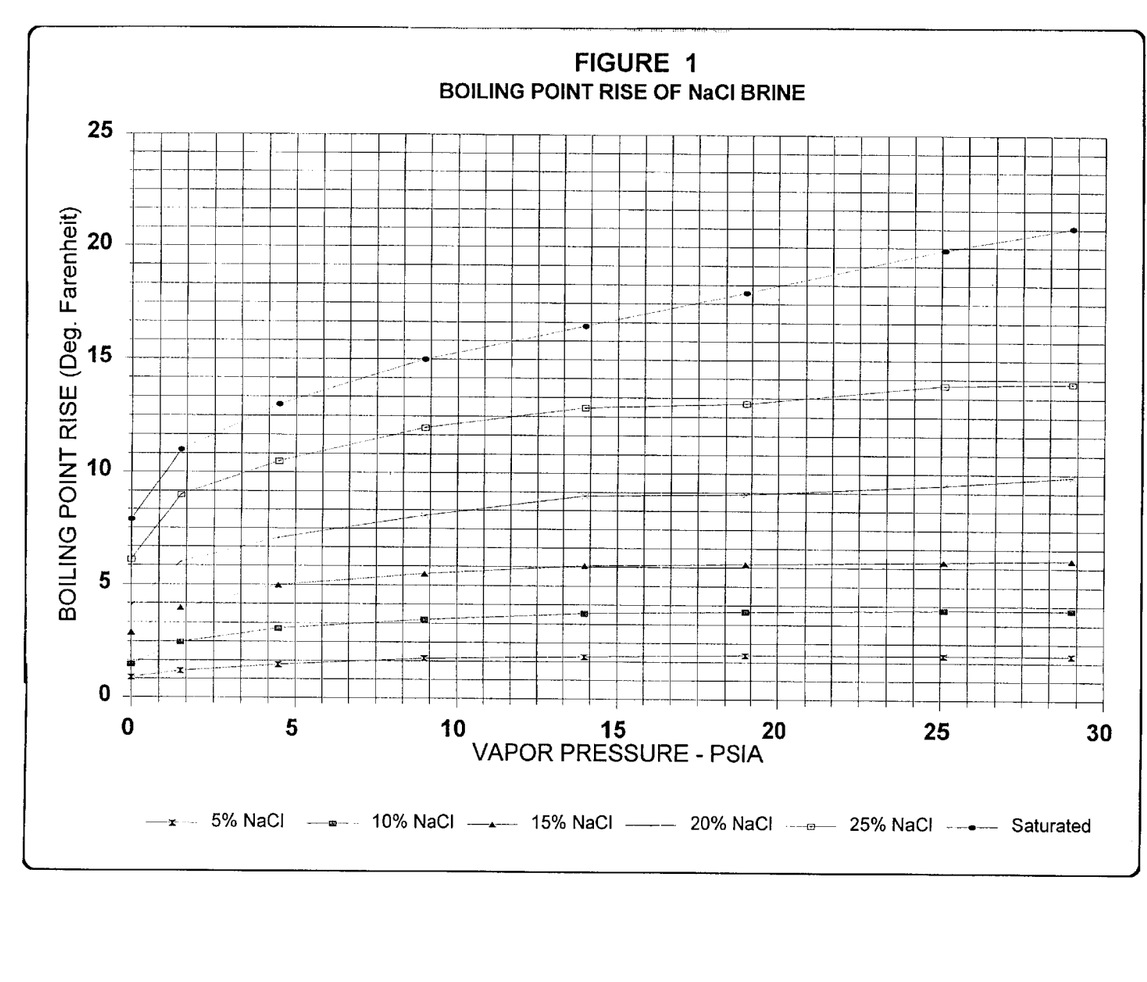
FIG. 1 is a graph demonstrating the effect of brine concentration and absolute pressure on the boiling point rise of sodium chloride brines.

The graph in FIG. 1 illustrates our findings of the effect of brine strength (concentration of NaCl) and absolute pressure on the boiling point rise of sodium chloride brines having different concentrations of NaCl content. The graph shows a plot of Boiling Point Rise in degrees Fahrenheit against Vapor Pressure in Pound Per Square Inch Absolute (PSIA) of salt solutions having concentrations of NaCl of 5 weight percent, 10 weight percent, 15 weight percent, 20 weight percent, 25 weight percent and saturation. It is noted that the concentration of NaCl in saturated brine increases with increasing vapor pressure and temperature.

The graph in FIG. 1 shows a plot of the boiling point rise of saturated sodium chloride brine is reduced by both a lower pressure and a lower weight percent sodium chloride brine. The concentrator system takes advantage of both of these phenomena. Whereas, a conventional solid salt evaporator employs a saturated salt solution, and one or more effects operating at elevated pressure. For example, the boiling point rise of saturated sodium chloride brine at atmospheric pressure is about 17 degrees Fahrenheit, while the boiling point rise of 20 weight percent brine at an absolute pressure of 7.0 pounds per square inch is only about 7.5 degrees Fahrenheit. This difference of almost 10 degrees Fahrenheit allows for a much more efficient vapor recompression. Because of the reduced boiling point rise, the energy required per pound of water vapor removed is lowered.

The curves and readings in the graph demonstrate that in accordance with this invention, the vapor recompression efficiency can be maximized by employing a concentrator system that minimizes the brine strength and the absolute pressure in the first effect, which is the effect equipped with a vapor recompressor. Also, by reducing the final concentration of the brine exiting the concentrator system of our invention we can reduce the difference in boiling temperatures between each effect. This allows lower absolute pressure in the first effect, thereby creating more favorable conditions for the vapor recompression stage. In other words, we can control the vapor recompressor conditions by minimizing the depleted brine strength introduced into our system and also control the absolute pressure in the first effect which is the effect equipped with the vapor recompressor.

In a conventional quadruple effect solid salt evaporator, the first (highest pressure) effect would be boiling at a significantly higher absolute pressure than the first effect concentrator of this invention. Thus, in a depleted brine-.concentrator in accordance with our invention, i.e. one fed with depleted brine, the first effect operates at a lower absolute pressure and this combination of reduced absolute pressure and weaker brine results in excellent vapor recompression and energy efficiency. For example, a double or triple effect depleted brine concentrator system with a steam jet thermocompressor on the first effect removes about 4.2 and 5 pounds of water per pound of motive steam, respectively. This compares very favorably with the 2.9 pounds of water removed per pound of motive steam for a conventional quadruple effect evaporator producing solid salt. Accordingly, this invention provides for significantly greater water removal efficiency than a conventional quadruple or even quintuple effect evaporator system producing solid salt. Thus the greater water removal per unit of energy of this invention results in higher efficiencies and lower operating costs, as is exemplified herein. Furthermore, the systems may reduce the amount of brine that must be recycled to the ion exchange towers.

In a conventional evaporation system producing solid salt, crystal growth and the need to prevent crystals from fouling the steam chest (heat exchanger) tubes are very important in order to maintain efficient operation. The evaporators must be designed to allow large amounts of brine containing crystals of salt (slurry) to be circulated through the steam chest tubes. This requires large circulating pumps and large steam chests usually employing titanium tubes which transfer heat efficiently. In contrast, this invention is free of crystal growth problems and fouling of equipment, so that the need for large circulation rates and pumps is eliminated. Use of falling film type steam chest evaporators is particularly applicable and efficient in this invention. Falling film steam chest evaporators allow the heat exchange to occur at or near the boiling point of the brine. The design of conventional evaporators producing solid salt require circulation of large quantities of brine through the steam chest under a liquid head that prevents boiling in the tubes and fouling of the equipment. This reduces the average temperature difference between the condensing vapor and the brine circulating through the tubes of the steam chest. The lower average temperature difference requires larger surface areas to transfer an equivalent amount of heat. In comparison, and for these reasons the systems of this invention require smaller heat exchangers, smaller circulation pumps, while at the same time the water removal efficiency is superior to other systems.

In accordance with this invention, the concentration of the depleted brine is capable of being carried out at temperatures below approximately 180 degrees Fahrenheit and in some cases as low as 135 degrees Fahrenheit. This compares to temperatures of as high as 240 degrees Fahrenheit in the prior art systems where the evaporators must be constructed of corrosion and erosion resistant metals such as Inconel. The low temperatures employed in our invention make it possible to eliminate all contact of the brine in our systems with metals, other than the titanium tubes that typically are used in the heat exchangers because of titanium's excellent heat transfer properties, resistance to corrosion and erosion. Since titanium is already a component of the anodes in membrane cells, the system is free of exposure to metals that add undesirable metallic contaminants to the brine. This permits the operators of concentrator systems of this invention, to decide whether to introduce the reconstituted brine directly into the membrane cells, without employing the usual neutralization, deionization (i.e. secondary ion exchange treatment), and reacidification steps as required by the prior art systems, as the circumstances at the plant installation and product requirements dictate. Thus, this invention provides substantial economies and operations by providing the choice of eliminating the necessity of employing any of, or combination of, these additional purification operations.

Systems in accordance with this invention utilize plastic materials of construction instead of metals for the major components of the installation including piping which may be made of PVC, CPVC, polypropylene, polyethylene, Kynar, Halar, Tefzel, Teflon and similar plastics such as fiberglass reinforced plastic (FRP) for circulation pumps with a required capacity of only about 20 weight percent of the capacity of the Inconel circulation pumps required in similar capacity salt evaporators disclosed in the prior art. Further, because the brine in the systems is always below the saturation point where solid salt crystals are present, the use of horizontal, cylindrical bodies in the concentrator systems with more modest diameters than heretofore employed to separate the vapor from the circulating brine. The concentrators may also be constructed from plastics such as fiberglass reinforced plastic (FRP), or plastics may be used to line metal components of the system. The horizontal vessels do not need to be designed for liquid holdup and crystal growth as required in the prior art systems involving brine slurries. In accordance with our invention, one or more 12 foot diameter, horizontal FRP or plastic lined separators is capable of being employed compared to the large, vertical metal bodies required for conventional salt evaporators of the prior art, which in comparison may be 30 feet in diameter.

Figure 2:
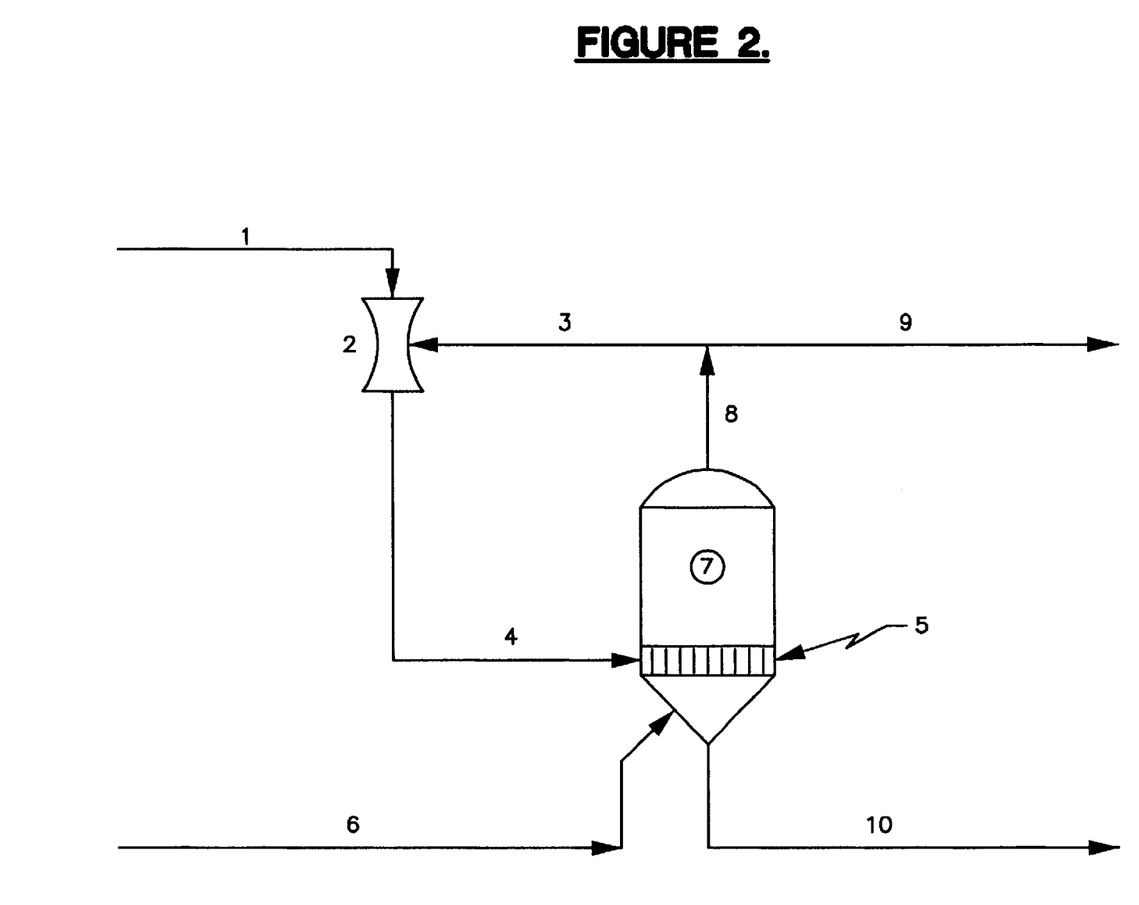
FIG. 2 is a simplified system demonstrating the principles of this invention.

FIG. 2 demonstrates the improvement in water removal efficiency gained by evaporating a water solution of 18 weight percent sodium chloride under a reduced absolute pressure to a 24 weight percent sodium chloride brine. For example, FIG. 2 shows a single effect concentrator operating under an absolute pressure of 2.6 PSIA. In this case 200 pounds per square inch gauge (PSIG) motive steam, 1, is fed to a thermocompressor, 2. Water vapor, 3, at 2.6 PSIA is drawn into the thermocompressor and compressed to 4.3 PSIA. The mixture, 4, of steam and vapor resulting from the thermocompression is saturated and fed to the shell side of the steam chest, 5, at 4.3 PSIA and 156 degrees Fahrenheit. The 18 weight percent sodium chloride brine, 6, is fed to the separator (i.e. body of the concentrator), 7, where the boiling point of the 24 weight percent brine being produced is about 146 degrees Fahrenheit (about 10 degree higher than the boiling point of water at 2.6 PSIA). The heat supplied by the mixture of motive steam and induced vapor, 4, causes the brine to boil, giving off water vapor, 8. Excess water vapor, 9, not recycled to the thermocompressor exits from the system. Brine, 10, containing 24 weight percent sodium chloride also exits from the system.

Table 1 shows a heat balance for an example of FIG. 2 where 100,000 pounds of NaCl are fed to the system as 18 weight percent sodium chloride brine at 153 degrees Fahrenheit and concentrated to 24 weight percent. As shown in the heat balance, 2.9 pounds of water vapor are removed per pound of motive steam. A conventional quadruple effect evaporation system producing solid salt will remove 2.9 pounds of water per pound of steam consumed in the evaporator. Thus the single effect concentrator in FIG. 2 will do the work of four effects in a solid salt evaporator system.

The relatively low boiling point of 146 degrees Fahrenheit permits the use of plastic materials of construction in the major components of the system, including the piping, pumps, valves, heat exchangers, and separators.

TABLE 1

Heat Balance of the System in FIG. 2

| HEAT INPUT | |
|---|---|
| Steam - 47,893 lbs/hr × 1199 BTU/lb = | 57.423 MM BTU/hr |
| Vapor - 86,082 lbs/hr × 1120 BTU/lb = | 96.412 MM BTU/hr |
| Brine - 555,556 lbs/hr × 105 BTU/lb = | 58.333 MM BUT/hr |
| TOTAL HEAT INPUT = | 212.168 MM BTU/hr |
| HEAT OUTPUT | |
| Vapor - 138,889 lbs/hr × 1120 BTU/lb = | 155.556 MM BTU/hr |
| Brine - 416,667 lbs/hr × 96 BTU/lb = | 40.000 MM BTU/hr |
| Cond. - 133,975 lbs/hr × 124 BTU/lb = | 16.613 MM BTU/hr |
| TOTAL HEAT OUTPUT = | 212.168 MM BTU/hr |
| lbs/hr water vapor removed = | 138,889 |
| lbs/hr. motive steam = | 47,893 |
| lbs water vapor/lb steam = | 2.9 |

It should be noted that better steam economy will be attained by increasing the number of effects and lowering the concentration of the brine in the first effect equipped with the thermocompressor. A third or even more multiple effects may be added but the benefit in steam economy will be partially offset by the increased capital costs. Accordingly, each case must be evaluated under the circumstances and conditions prevailing at the time the evaluation is made.

Figure 3:
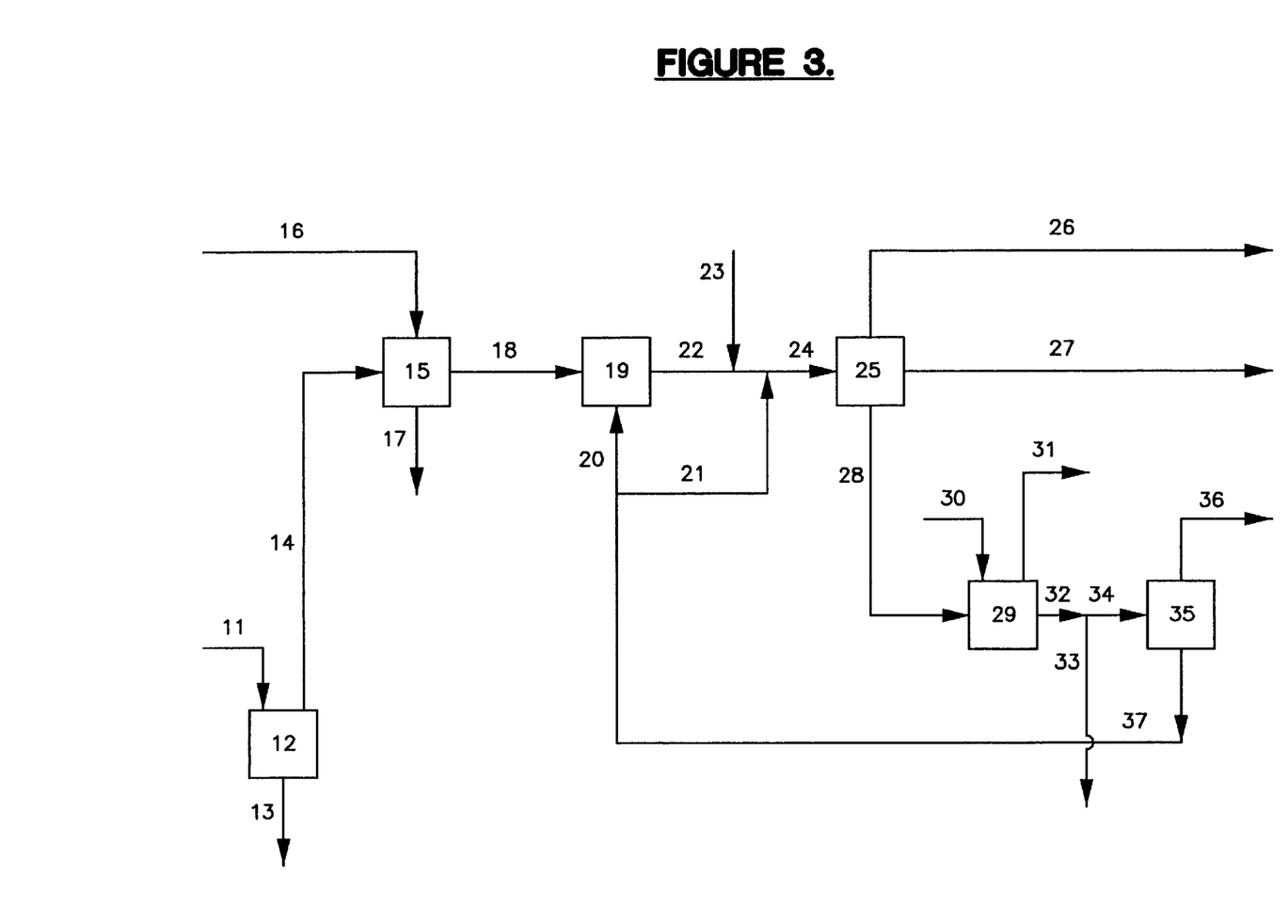
FIG. 3 is a flowsheet demonstrating how one of the depleted brine concentrator systems is incorporated into a typical chlor-alkali plant installation using membrane cells and receiving its salt requirement as pipeline brine from a brine well plant.

FIG. 3 is a flow sheet demonstrating how a depleted brine concentrating system in accordance with this invention is incorporated into a typical chlor-alkali plant employing membrane cells and receiving its salt requirement in the form of pipeline brine produced by solution mining underground salt deposits. Water, 11, is injected into brine wells, 12, where some of the water and insoluble solids remain in the underground cavity, 13. Nearly saturated brine is transported by pipeline, 14, to a conventional brine treatment system, 15. Solutions of sodium carbonate and sodium hydroxide, 16, are added to precipitate solid calcium carbonate and magnesium hydroxide, 17, which are removed by settling and filtration. The treated brine, 18, then flows to ion exchange towers, 19, for further removal of impurities. Reconcentrated brine, 20, may be returned to the ion exchange towers, or some or all of it, 21, may bypass the towers. Brine, 22, exiting from the towers is acidified with muriatic acid, 23, and joins the by pass brine, 21. The mixture, 24, is then fed to the membrane cells, 25, where moist chlorine gas, 26 and hydrogen and sodium hydroxide solution, 27, are produced. Depleted brine, 28, leaves the cells at a concentration of about 16–18 weight percent sodium chloride. The depleted brine flows to a dechlorinator, 29. Chemicals, 30, such as described above and in connection with the prior art, are added to dechlorinate, and neutralize the depleted brine. During the dechlorination process a small amount of water vapor, 31, is removed. The dechlorinated brine, 32, may be divided to send a small slipstream, 33, for disposal in accordance with environmental regulations. The remaining major portion of the depleted brine, 34, is fed to the concentrator system, 35, where water vapor is removed, 36. The reconcentrated brine, 37, is then ready for reuse as about 22–26 weight percent sodium chloride return brine to the ion exchange towers, 20, or bypass return brine, 21.

Figure 4:
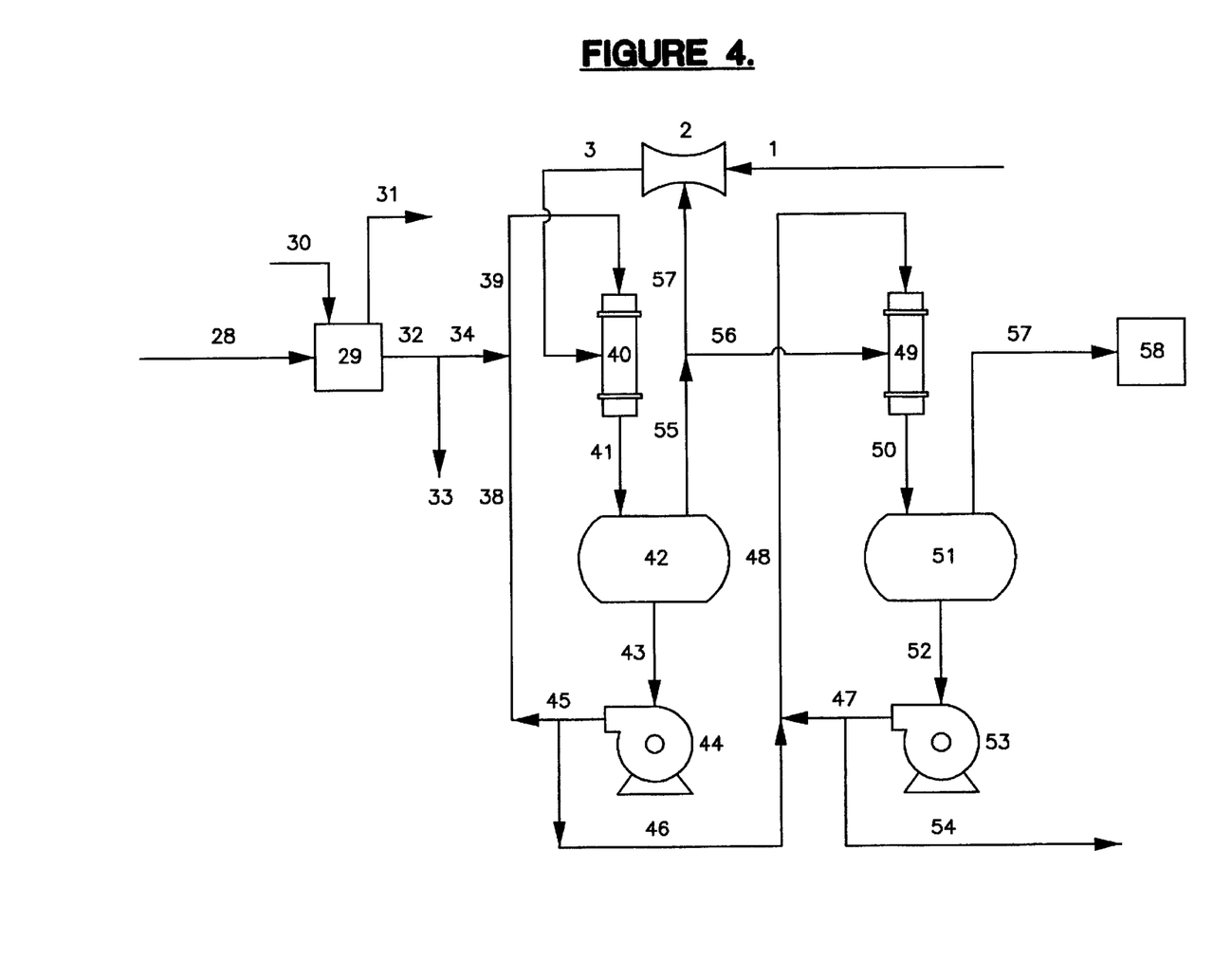
FIG. 4 demonstrates details of an embodiment of this invention where the system uses a double effect concentrator with a steam jet thermocompressor operating on the first effect.

FIG. 4 demonstrates details of an embodiment of this invention where a double effect concentrator system is equipped with a thermocompressor on the first effect. In FIG. 4, depleted brine, 28, is fed to the dechlorinator, 29, where required chemicals, 30, are added to dechlorinate the brine, a small amount of water vapor, 31, is removed, but the brine is not neutralized. The dechlorinated brine, 32, exits from the dechlorinator and a small slipstream, 33, may or may not be removed for treatment and disposal. The balance of the dechlorinated, depleted brine, 34, joins circulating brine, 38, and the mixture, 39, flows to a falling film heat exchanger, 40. Brine and water vapor flow, 41, to a separator, 42, where the separated brine, 43, exits to a circulating pump, 44. Brine, 45, exiting from the circulating pump splits into two streams, with a portion of the flow, 46, joining the second effect circulating stream, 47. The mixture, 48, flows to the second effect steam chest, 49. Brine and water vapor flow, 50, to the second effect separator, 51, and the separated brine flows, 52, to the second effect circulating pump, 53, and reconcentrated brine, 54, exits from the system at a concentration of, between about 22 to 26 weight percent sodium chloride. Water vapor, 55, exits from the first effect separator, 42. The excess vapor, 56, goes to the steam side of the second effect heat exchanger, 49. The balance of the vapor, 57, is drawn into the thermocompressor, 2, with the energy supplied by the motive steam, 1, and the mixture of steam and water vapor is desuperheated and fed to the shell side of the first effect heat exchanger, 40. Vapor, 57, from the second effect separator, 51, exits to a conventional barometric condenser and vacuum source, 58, where the vapor is condensed under a controlled vacuum.

This system combines the advantage of introducing the weakest brine into the first effect which is equipped with the steam jet thermocompressor with low temperature operation so that all key components, including piping, pumps and concentrators are made of plastic materials of construction with the exception of the heat exchanger tubing which is customarily made of titanium because of its excellent heat transfer properties. Thus the invention affords the advantages of efficient removal of water plus the elimination of neutralization and acidification chemicals.

Mechanical vapor recompression may be employed instead of or in conjunction with the above given description of the invention. Mechanical vapor recompression allows both a different configuration and operation of the invention. It should be noted that this invention is not limited to a particular configuration or operation. A mechanical vapor recompression system may use and be employed on one or more concentration effects. On multiple effects, mechanical vapor recompression may be employed individually on each effect. In this instance the operating pressure may be approximately the same in each effect. In such a system the vapor from the separator is compressed and recycled back to the heat exchanger of that effect. The compressed vapor can be desuperheated with condensate from the heat exchanger. The compressed, saturated vapor is at a higher temperature than the boiling point of the depleted brine at reduced pressure in that effect. This provides the temperature driving force necessary in the heat exchanger. The low boiling point rise employed by this invention allows lower compression ratios resulting in lower energy requirements for the mechanical vapor recompression compressor.

Alternatively, mechanical vapor recompression may employ multiple effects whereby the vapor from one effect is compressed and fed to the heat exchanger of another effect. The vapors from the separator of this effect may be used to feed the heat exchangers of other effects.

Mechanical vapor recompression can utilize compressors, blowers, or fans. Since the preferred operation of this invention is at low absolute pressures where the specific volume of the vapor is high, the use of mechanical vapor recompression fans may be advantageous. The mechanical vapor recompression fans accommodate high actual volumetric flow rates at low compression ratios. The high specific volume vapor generated by this process times the mass flow rate of vapor results in high actual volumetric flow rates. The low compression ratios produced by the fans may require a series of fans to generate the overall compression ratio necessary to raise the saturated vapor temperature required by the heat exchanger.

In addition, depleted brine may be fed to each effect individually and concentrated to 22 to 26 weight percent sodium chloride, or the depleted brine can cascade through multiple effects at different concentrations until the desired 22 to 26 weight percent sodium chloride concentration is achieved in the last effect.

In those cases where environmental requirements dictate that disposal of soluble solids must be minimized, the invention is compatible with known disposal methods. For example, a slipstream of the dechlorinated brine may be refrigerated to produce Glauber Salt, and the purified brine returned to the invention for concentration. Another conventional method of reducing dissolved solids is to feed a slipstream of reconcentrated brine to a small, conventional solid salt evaporator and utilize the exhaust vapor from the invention. Systems adding the small solid salt evaporator remove about 4.0 pounds of water vapor per pound of motive steam. Further, the solid salt may be recovered and sold or reused in the cell plant. The amount of the slipstream to be concentrated in the solid salt effect is small compared to the other streams handled in accordance with this invention. Accordingly there are a number of alternative methods and combinations which may be employed in place of those described herein including using refrigeration to remove sodium sulfate as Glauber Salt. Further, refrigeration may be employed to remove Glauber Salt from the bitterns, as well as the small solid salt evaporator just described.

In a preferred embodiment of this invention, as described above, the depleted brine exiting the membrane cells is dechlorinated before being introduced into the concentrator systems of this invention, in order to avoid the emission of chlorine fumes which would be released in the concentrators. However other techniques may be employed to prevent this problem. When purifying the reconstituted brine before introduction to the membrane cells any combination of the purification steps of dechlorination, neutralization, deionization, and reacidification may be employed since there may be circumstances in the operation of the concentrator systems of our invention where any one or combination of these steps may be advantageously used in the system.

Whereas we have described this invention in great detail with respect to concentration of chlor-alkali membrane cell brine many of the findings and teachings of this invention are applicable to other evaporative and concentrator systems, such as in the production of alkali brines other than sodium chloride and also in the processing of other chemicals such as chlorates.

It is known that in several chlor-alkali diaphragm plant installations that conversion of the diaphragm cells to membrane cells have been made. In these cases the C.P. Salt from the diaphragm cell plant is used to reconcentrate the depleted brine. This conversion is limited to about 40 to 50% membrane cell capacity by the amount of C.P. Salt available from the diaphragm cell plant. This invention allows efficient removal of water from the depleted brine requiring less C.P. Salt to bring the brine up to the desired concentration of 22 to 26 weight percent sodium chloride. Therefore a greater percentage, up to 100%, of the diaphragm cells may be converted to the membrane cells. The use of unneutralized reconcentrated depleted brine reduces the chemicals necessary to achieve the proper pH of the brine feeding the membrane cells.

In a preferred embodiment of this invention, the reconcentrated depleted brine is mixed with the feed brine either before or after the ion exchange towers. An alternative to this flow scheme would be to keep the reconcentrated depleted brine separate from the feed brine. In this case the reconcentrated depleted brine would be pH adjusted, if necessary, and then fed to specific membrane cells. The feed brine would be fed to other membrane cells.

Although this invention has been described using specific drawings and examples and certain specific embodiments thereof have been emphasized, we do not intend that this invention be limited in scope except as expressly defined in the appended claims.

What is claimed is:

1. A method for concentrating depleted brine exiting a chlor-alkali membrane cell plant installation which comprises:
   dechlorinating the depleted brine to remove chlorine therefrom,
   introducing the dechlorinated depleted brine into an effect of a concentrator system,
   maintaining said concentrator system under reduced absolute pressure, so that the boiling point rise of the brine in the effect concentrator is between about 6 to 10 degrees Fahrenheit,
   maintaining the temperature in the effect concentrator at below about 180 degrees Fahrenheit thereby allowing efficient vapor recompression on the effect,
   concentrating the brine to an alkali chloride content below saturation, and
   returning the nearly saturated brine so produced for use in the membrane cell plant installation.

2. The method in claim 1 wherein the alkali chloride is sodium chloride.

3. The method of claim 2 wherein pipeline brine is employed without producing solid salt or solid salt slurry.

4. The method of claim 2 wherein pipeline brine is employed and the reconcentrated depleted brine is not neutralized.

5. The method of claim 4 wherein the un-neutralized reconcentrated depleted brine is used to balance the pH of treated feed brine.

6. The method of claim 2 wherein pipeline brine is employed and reconcentrated depleted brine is fed directly to membrane cells.

7. The method of claim 2 wherein the reconcentrated depleted brine is mixed with treated feed brine prior to an ion exchange tower, and then the combined deionized brine stream is fed to membrane cells.

8. The method of claim 2 wherein pipeline brine is employed and reconcentrated depleted brine is mixed with chemically treated brine following an ion exchange treatment prior to being fed to the membrane cells.

9. The method of claim 1 wherein the depleted brine is introduced into the first effect.

10. The method of claim 9 wherein the depleted brine exiting the cells contains about 16 to 18 percent by weight of sodium chloride.

11. The method of claim 9 wherein the concentrator is maintained at a temperature between about 135 and 180 degrees Fahrenheit.

12. The method of claim 9 wherein the concentrated brine returned to the cells is between about 22 to 26 weight percent sodium chloride.

13. The method of claim 9 wherein the chlor-alkali membrane cell installation has been converted in part or expanded from a diaphragm cell plant operating on pipeline brine, and wherein the method of claim 1 is employed in converting additional diaphragm cells to membrane cells or expanded by addition of membrane cells.

14. The method of claim 9 wherein pipeline brine is employed and the depleted brine is concentrated and solid salt is produced employing some of the pipeline brine.

15. The method of claim 1 wherein the vapor recompression is obtained by using a steam jet thermocompressor.

16. The method of claim 1 wherein the vapor recompression is obtained by using a mechanical compressor.

17. The method of claim 1 wherein the vapor recompression is obtained by using one or more single stage blowers.

18. The method of claim 1 wherein the major components of the concentrator system including piping, pumps, heat exchangers, and separators are made of plastic materials of construction or plastic bonded metals.

19. The method of claim 1 wherein the heat exchanger tubes are made of titanium.

* * * * *